United States Patent
Nussbaumer

(10) Patent No.: US 9,765,910 B2
(45) Date of Patent: Sep. 19, 2017

(54) METHOD FOR INFLUENCING THE THREAD GEOMETRY OF AN INTERNAL THREAD FOR INTERNAL COMBUSTION ENGINES

(71) Applicant: Robert Bosch GmbH, Stuttgart-Feierbach (DE)

(72) Inventor: Gernot Nussbaumer, Pennewang (AT)

(73) Assignee: ROBERT BOSCH GMBH, Stuttgart-Feuerbach (DE)

( * ) Notice: Subject to any disclaimer, the term of this patent is extended or adjusted under 35 U.S.C. 154(b) by 985 days.

(21) Appl. No.: 13/761,337

(22) Filed: Feb. 7, 2013

(65) Prior Publication Data

US 2013/0200615 A1  Aug. 8, 2013

(30) Foreign Application Priority Data

Feb. 7, 2012  (AT) .................................. A 162/2012

(51) Int. Cl.
*F16L 19/02* (2006.01)
*F16L 15/00* (2006.01)
(Continued)

(52) U.S. Cl.
CPC ........... *F16L 15/00* (2013.01); *F02M 47/027* (2013.01); *F02M 55/005* (2013.01);
(Continued)

(58) Field of Classification Search
CPC ...... F16L 15/00; F16L 15/001; F02M 55/005; F02M 47/027; F02M 2200/8076
(Continued)

(56) References Cited

U.S. PATENT DOCUMENTS 3,355,192 A * 11/1967 Kloesel, Jr. ........... E21B 17/042
285/334
2013/0200616 A1* 8/2013 Nussbaumer ........... F16L 15/00
2015/0219139 A1* 8/2015 Pasedach ............. F02M 47/027
411/366.1

FOREIGN PATENT DOCUMENTS

AT           509877 A4    12/2011
CH    WO 2009033304 A1 *  3/2009  ........... F02M 55/025
(Continued)

OTHER PUBLICATIONS

Austrian Search Report dated Aug. 28, 2012 corresponding with Austrian Application A 161/2012.

*Primary Examiner* — Gregory Binda
(74) *Attorney, Agent, or Firm* — Fitch, Even, Tabin & Flannery LLP

(57) ABSTRACT

In a method for influencing the thread geometry of an internal thread of a first component of an injection device for internal combustion engines, which is provided for carrying high-pressure fluid, wherein the first component has a tubular end portion and an internal thread is formed on the interior surface of the tubular end portion, and a second component having an exterior surface on at least a portion thereof so as to be received in the tubular end portion of the first component wherein the exterior surface is threaded so said second component can be screwed and clamped against a support surface of the first component, and wherein the tubular end portion on the external side is acted upon by a radial compression force allowing a plastic deformation. The tubular end portion is transformed thereby in such a manner that the internal thread obtains an inner diameter (D) continuously decreasing towards the free end.

3 Claims, 3 Drawing Sheets

(51) Int. Cl.
  *F02M 47/02* (2006.01)
  *F02M 55/00* (2006.01)
  *F02M 61/16* (2006.01)

(52) U.S. Cl.
  CPC ......... *F02M 61/168* (2013.01); *F16L 15/001* (2013.01); *F16L 19/0206* (2013.01); *F02M 2200/03* (2013.01); *F02M 2200/40* (2013.01); *F02M 2200/8076* (2013.01); *Y10T 29/49432* (2015.01); *Y10T 29/49881* (2015.01)

(58) Field of Classification Search
  USPC ............... 285/333–334, 355, 390; 411/366.1
  See application file for complete search history.

(56) References Cited

FOREIGN PATENT DOCUMENTS

| | | |
|---|---|---|
| EP | 0653561 A1 | 5/1995 |
| EP | 2336548 A1 | 6/2011 |
| GB | 2436931 A | 10/2007 |
| WO | 2011/092040 A1 | 8/2011 |
| WO | 2012/058703 A1 | 5/2012 |

\* cited by examiner

METHOD FOR INFLUENCING THE THREAD GEOMETRY OF AN INTERNAL THREAD FOR INTERNAL COMBUSTION ENGINES

CROSS-REFERENCE TO RELATED APPLICATION

This U.S. application claims the foreign priority filing date benefit of Austrian Application A 161/2012, filed Feb. 7, 2012, and the full disclosure of said Austrian application is hereby incorporated herein by reference.

FIELD OF THE INVENTION

The invention relates to a method for influencing the thread geometry of an internal thread of a first component of an injection device for internal combustion engines, which is provided for carrying high-pressure fluid, wherein the internal thread is formed on a tubular end portion of the first component, into which a second component can be screwed and clamped against a support surface of the first component.

The invention further relates to a threaded connection of high-pressure fluid-carrying components of an injection device for internal combustion engines, wherein a first component comprises an internal thread on a tubular end portion and a second component comprises an external thread that is screwable into the internal thread, said second component being clampable by an end face against a support surface of the first component when tightening the threaded connection.

BACKGROUND OF THE INVENTION

Common rail systems for heavy diesel engines require large accumulator volumes for hydraulic reasons. Hence result—also for manufacturing reasons—large sealing diameters for sealing the high-pressure-loaded components. In terms of thread load, those large sealing diameters are disadvantageous in threaded connections. On the one hand, high prestressing forces have to be used and, on the other hand, the dynamic load on the thread is increased by the pulsating internal pressure load.

At present, a relief of the thread can practically and effectively only be achieved by increasing the base radius of the thread—in order to reduce the notch effect—and by increasing the diameter of the thread—which entails an increase in the force-transmitting surface. A positive influence on the load-carrying capacity of the screw connection can, moreover, be achieved by an improved material quality, an increased thread pitch, in particular with highly hardened and tempered screw connections, heat treatment techniques, thread manufacturing (final tempering-final rolling), and via the lubrication state. Geometrically, the use of tension nuts and threads with flank angle differences as well as high screw-in depths may be helpful for the fatigue strength.

All of the usable measures mentioned are, however, limited in their effects, in particular where high-prestressing forces are required.

SUMMARY OF THE INVENTION

The invention, therefore, aims to improve the fatigue strength of the threaded connection of high-pressure fluid-carrying components of an injection device for internal combustion engines in a simple manner.

To solve this object, the invention in a method of the initially defined kind provides that the tubular end portion on the external side is acted upon by a radial compression force allowing a plastic deformation, thus transforming the tubular end portion in such a manner that the internal thread obtains an inner diameter continuously decreasing towards the free end.

To solve this object, the invention in a threaded connection of the initially defined kind further provides that the first component is transformed by a compressive deformation such that the internal thread has an inner diameter continuously decreasing towards the free end.

The invention thus relates to a thread geometry prestressed and predeformed by preshaping, which will result in a substantially reduced stress and change in the stress distribution between the turns of the thread. The load on the thread will be reduced by causing a selective plastic deformation of the internal thread by preshaping with a high compressive force on the external side of the tubular end portion. On the one hand, this will enable the introduction of internal stresses into the groove of the thread and, on the other hand, this will cause a plastic deformation resulting in a thread pitch difference between the individual thread turns in the internal thread. These effects will increase the load-carrying capacity of the thread and, in addition, change the force introduction into the thread. Both measures will have very positive effects on the load-carrying capacity of the thread.

The thread pitch difference in this case is achieved in that the axial extension of the internal thread is reduced by an inward deformation, with the number of thread turns remaining constant. The internal thread thus obtains a smaller thread pitch than the external thread.

The thread pitch difference results in a homogenization of the force distribution in the internal thread. In conventional threaded connections, the distribution of the screwing force on the individual turns of the internal thread is very non-uniform. The first bearing turn of the connection is loaded the most. By homogenizing the force distribution, the critical point stressed the most will be relieved, while the turns that are farther away from the support surface will, at the same time, be stressed more. This has become possible in that the internal thread has a smaller pitch than the external thread, which is why the screwing force is at first introduced into the thread turn side facing away from the support surface. With the prestressing force increasing, also the thread turns located nearer to the support surface will increasingly participate in the load transmission. Hence results an altogether more uniform load distribution of the paired turns of the thread.

In order to facilitate the transformation of the tubular end portion, it is preferably provided that the first component, on the transition to the tubular end portion, comprises a peripherally extending material taper on its outer side.

A particularly advantageous application of the invention relates to a configuration in which the first component is an integrated high-pressure accumulator of a modular common rail injector and the second component is a supporting body of the modular common rail injector.

BRIEF DESCRIPTION OF THE FIGURES

In the following, the invention will be explained in more detail by way of an exemplary embodiment schematically illustrated in the drawing. Therein.

DETAILED DESCRIPTION

Figure 1:
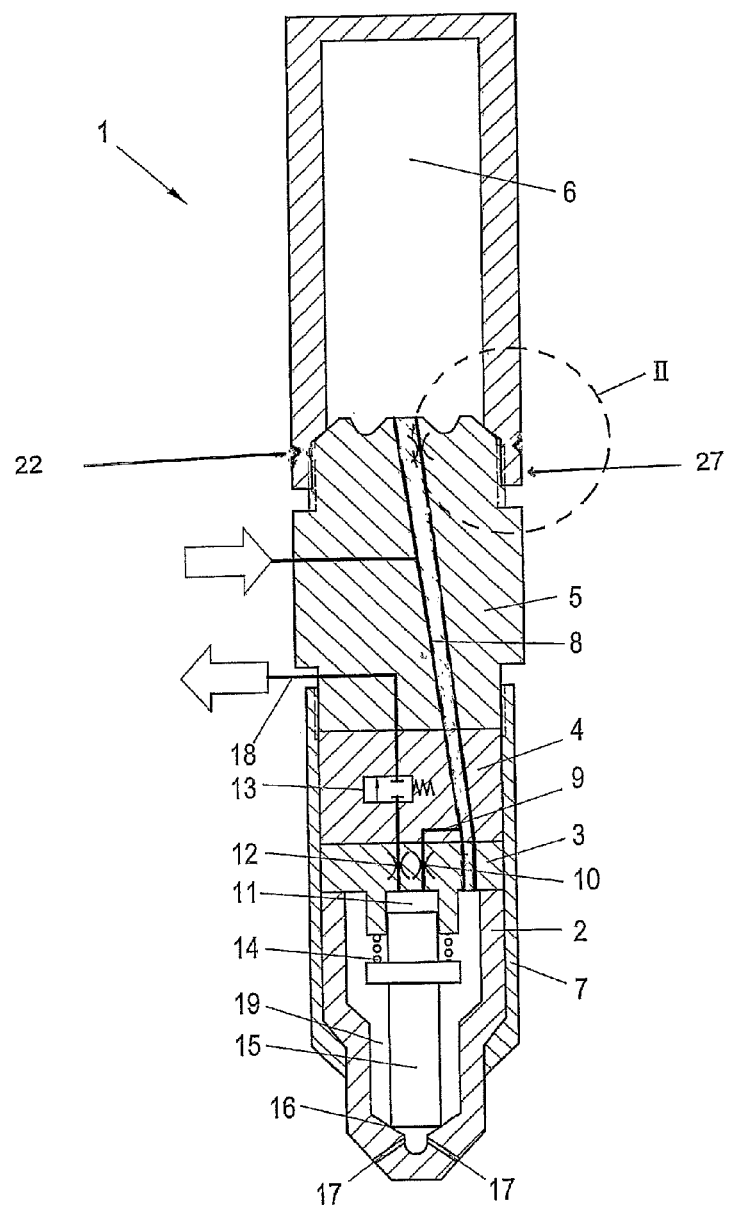
FIG. 1 illustrates the basic structure of a modular common rail injector.

FIG. 1 depicts an injector 1 comprising an injection nozzle 2, a throttle plate 3, a valve plate 4, a supporting body 5 and a high-pressure accumulator 6, wherein a nozzle clamping nut 7 screwed with the supporting body 5 holds together the injection nozzle 2, the throttle plate 3 and the valve plate 4. In the idle state, the solenoid valve 13 is closed such that high-pressure fuel will flow from the high-pressure accumulator 6 into the control chamber 11 of the injection nozzle 2 via the high-pressure line 8, the transverse connection 9 and the inlet throttle 10, yet with the drain from the control chamber 11 via the outlet throttle 12 being blocked on the valve seat of the solenoid valve 13. The system pressure applied in the control chamber 11 together with the force of the nozzle spring 14 presses the nozzle needle 15 into the nozzle needle seat 16 such that the spray holes 17 are closed. When the solenoid valve 13 is actuated, it will enable the passage via the solenoid valve seat, and fuel will flow from the control chamber 11 through the outlet throttle 12, the solenoid valve anchor chamber and the low-pressure bore 18 back into the fuel tank (not illustrated). In the control chamber 11, an equilibrium pressure defined by the flow cross sections of the inlet throttle 10 and the outlet throttle 12 is established, which is so low that the system pressure applied in the nozzle chamber 19 is able to open the nozzle needle 15, which is longitudinally displaceably guided in the nozzle body, so as to clear the spray holes 17 and effect injection.

As soon as the solenoid valve 13 is closed, the fuel drain path is blocked by the outlet throttle 12. Fuel pressure again builds up in the control chamber 11 via the inlet throttle 10, thus creating an additional closing force, which reduces the hydraulic force on the pressure shoulder of the nozzle needle 15 and exceeds the force of the nozzle spring 14. The nozzle needle closes the path to the injection openings 17, thus terminating the injection procedure.

Figure 2:
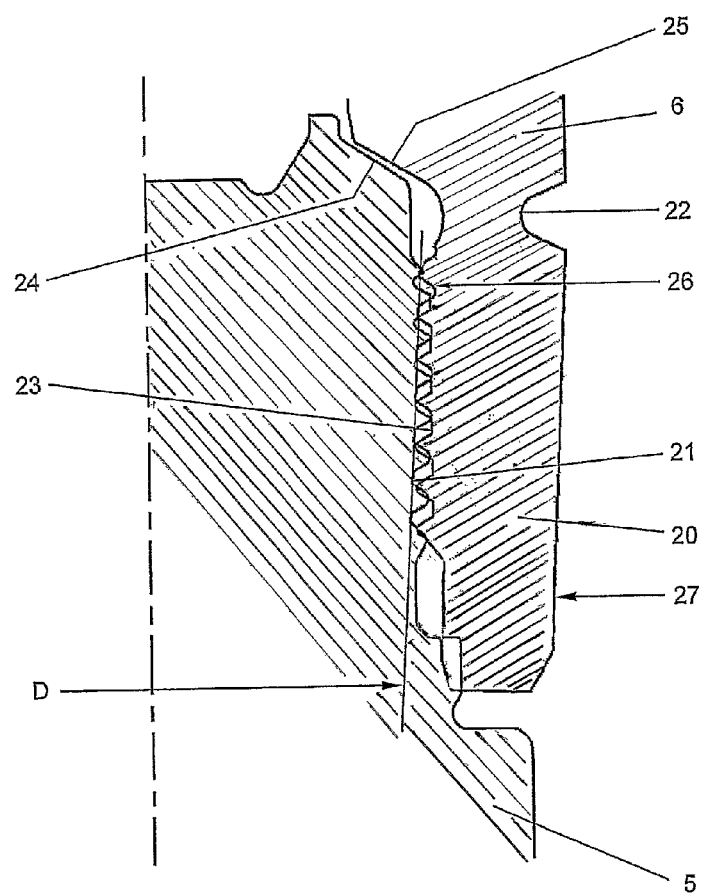
FIG. 2 is a detailed view of the threaded connection of the supporting body to the high-pressure accumulator.
Figure 3:
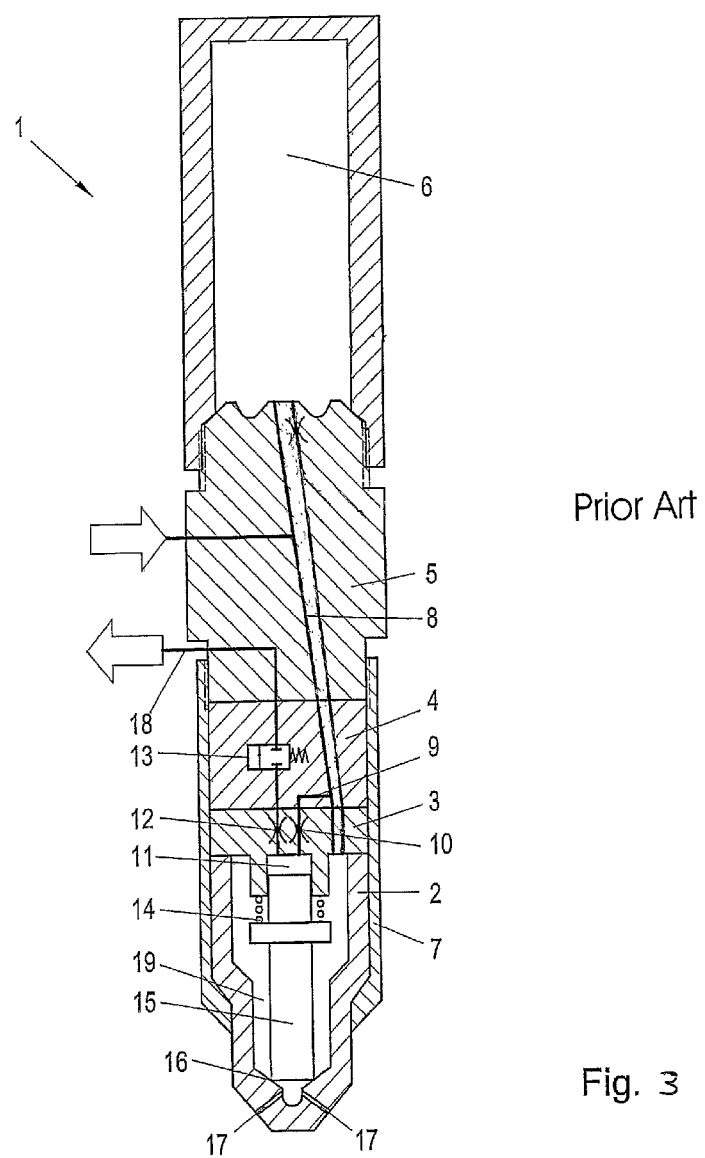
FIG. 3 illustrates the basic known structure of a modular common rail injector.

According to the invention a radial compression force 27 is applied as shown in FIG. 1 and more particularly in the enlargement of detail II as shown in FIG. 2.

Modular common rail injectors are used in modular common-rail systems, which are characterized in that a portion of the accumulator volume present within the system is present in the injector itself. Modular common-rail systems are used in particularly large engines, in which the individual injectors are sometimes arranged in considerably spaced-apart relation. The single use of a common rail for all injectors does not make sense with such engines, since the long lines would cause a massive drop of the injection pressure during the injection, thus considerably reducing the injection rate during extended injection periods. Such engines, therefore, comprise a high-pressure accumulator arranged in the interior of each injector. Such a mode of construction is referred to as a modular structure, since each individual injector has its own high-pressure accumulator and can thus be used as an independent module. A high-pressure accumulator in this case is not meant to be an ordinary line, but a high-pressure accumulator denotes a pressure-proof vessel having a feed line and a discharge line and whose diameter is clearly increased relative to high-pressure lines in order to allow a certain injection amount to be discharged from the high-pressure accumulator without causing an immediate pressure drop.

FIG. 2 depicts an enlarged illustration of the detail II of FIG. 1. The high-pressure accumulator 6 comprises a tubular end portion 20 provided with an internal thread 21. On the transition to the tubular end portion 20, the high-pressure accumulator 6 comprises a peripherally extending material taper 22, which is, for instance, designed as a peripheral groove. The supporting body 5 is provided with an external thread 23, which cooperates with the internal thread 21 in the state screwed into the high-pressure accumulator 6, of the supporting body 5. When tightening the screw connection, the conical end face 24 of the supporting body 5 is clamped against the conical support surface 25 of the high-pressure accumulator 6 so as to ensure sealing between the high-pressure accumulator 6 and the supporting body 5. In conventional configurations of the threaded connection, the first turn 26 of the thread will be stressed the most in the clamped state.

According to the invention, a radial compression force 27 is externally applied in the region of the internal thread 21, leading to a plastic deformation of the tubular end portion 20. Thus, a thread geometry prestressed and predeformed by preshaping will be created. The radial compression force 27 is, for instance, applied by roller burnishing. As a result, a linearly downwardly increasing deformation of the thread will, in particular, be observed, thus creating an inner diameter D of the internal thread 21 that is, in particular continuously, reduced towards the free end. The thread pitch of the internal thread 21 will thus be reduced relative to the thread pitch of the external thread 23 such that the first bearing turn 26 of the thread will be relieved when tightening the thread.

In FIG. 2, the illustrated deformation is ten times exaggerated.

The invention claimed is:

1. A threaded connection of high-pressure fluid-carrying components of an injection device for internal combustion engines, comprising
    a first component comprising a tubular end portion, the tubular end portion having an internal thread, the tubular end portion having an outer side, the tubular end portion terminating in an end, and the internal thread extending in a direction towards the end,
    the first component, on the transition to the tubular end portion, has an outer side and the first component comprises a peripherally extending material taper on that outer side; and
    a second component comprising an external thread that is screwable into the internal thread to thereby form a threaded connection, said second component being clampable by an end face against a support surface of the first component when tightening the threaded connection,
    wherein the first component is transformed by a radial compressive pressure applied to the outer side to deform the tubular end portion such that the internal thread has an inner diameter (D) continuously decreasing in the direction towards the end of the tubular end portion.

2. A threaded connection according to claim 1, wherein the first component is an integrated high-pressure accumulator of a modular common rail injector and the second component is a supporting body of the modular common rail injector.

3. A threaded connection of high-pressure fluid-carrying first and second components of an injection device for internal combustion engines, the first component comprising an integrated high-pressure accumulator of a modular common rail injector, the first component having a tubular end portion, the tubular end portion having an internal thread for threadable connection with a second component, the tubular end portion having an outer side, the tubular end portion terminating in an end, wherein the internal thread on the tubular end portion extends towards but not all the way to the end, and the first component, on the transition to the tubular end portion, has an outer side and the first component comprises a peripherally extending material taper on that outer side; and the second component comprising a supporting body of the modular common rail injector, the second component having a portion with an external thread, said second component inserted into the end with the external thread screwed into the internal thread to thereby form a threaded connection between the first and second components, the second component having an end face clampable against a support surface of the first component when tightening the threaded connection between the first and second components, wherein the first component is deformed by an inwardly applied radial compressive pressure to the outer side of the tubular end portion such that the internal thread has an inner diameter (D) that continuously decreases in a direction towards the free end of the tubular end portion.

* * * * *